Figure 1:
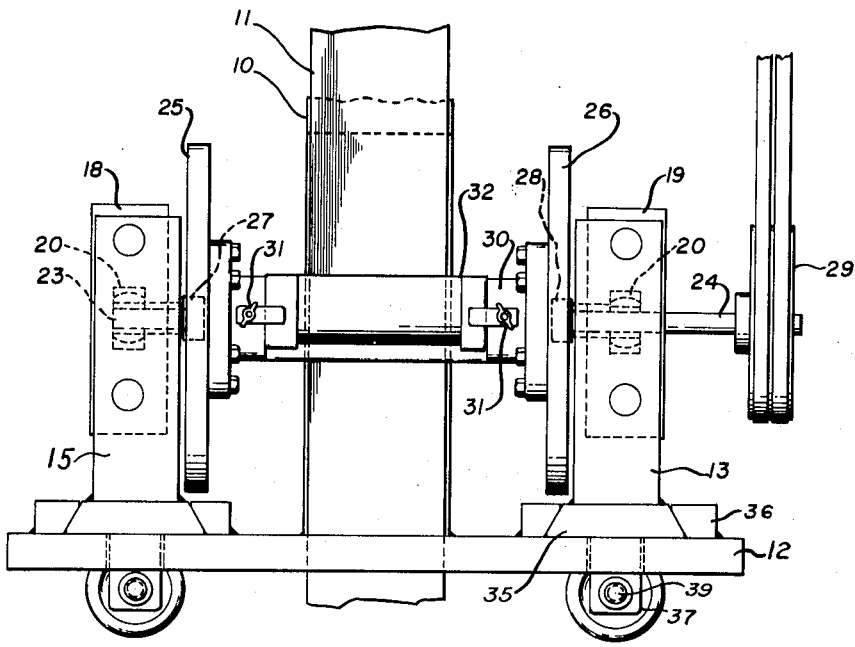

Oct. 25, 1955  W. H. HAUSSLER, JR., ET AL  2,721,423
CONVEX GRINDER
Filed Sept. 18, 1952  2 Sheets-Sheet 1

INVENTORS,
RALPH W. RICHARDS
WILLIAM H. HAUSSLER, JR.
BY Woodling and Krost

ATTORNEYS

Oct. 25, 1955  W. H. HAUSSLER, JR., ET AL  2,721,423
CONVEX GRINDER

Filed Sept. 18, 1952  2 Sheets-Sheet 2

INVENTORS,
RALPH W. RICHARDS
WILLIAM H. HAUSSLER, JR.
BY
Woodling and Krost

ATTORNEYS

United States Patent Office 2,721,423
Patented Oct. 25, 1955

2,721,423

CONVEX GRINDER

William H. Haussler, Jr., Utica, and Ralph W. Richards, West Winfield, N. Y., assignors to Utica Drop Forge & Tool Corporation, a corporation of New York Application September 18, 1952, Serial No. 310,241

4 Claims. (Cl. 51—101)

This invention relates to grinding devices in general, and relates more specifically to a work holding fixture providnig a surface generating movement for grinding and smoothing an airfoil surface.

Airfoil blades are old and well-known structures but have been finding increasing importance with the advent of jet propulsion for aircraft. High speed devices employing airfoil blades require extremely accurate and substantially perfect impeller airfoil blades. In the construction of such blades the convex surface must be ground quite accurately. Some of these airfoil blades not only have the well-known airfoil contour on the convex side, but also have a taper. Thus, the convex surface of the airfoil blade is made up of substantially an infinite number of small increments of surface each constituting a straight line across the length of the blade, but each having a different angle with respect to a fixed axis line of the blade.

Line grinding of any surface is considered to be far superior to surface area grinding. That is, if a grinding element can be brought to bear only on one of the surface increments at a time rather than being caused to contact a wide area of the surface, the grinding element will carry the removed metal away from the surface being ground, and a clean surface of the grinding element will be presented to the work. Therefore, there is no build up of removed metal particles to clog the grinding surface and scratch or cause uneven grinding of the surface.

Nevertheless, with airfoil blades having a tapered convex airfoil surface it has become the practice in the industry to form a pressure shoe formed substantially in the shape to which it is desired to grind the convex surface. The grinding belt of a belt type machine is then passed across the opening of the shoe recess, and the workpiece is forced into the recess of the shoe and the belt is squeezed between the workpiece and the shoe recess. Such pushing of the workpiece into the recess has been less than satisfactory. There is a tendency to produce a whip action at the top of the cavity which flattens a portion of the airfoil blade and spoils the precise airfoil contour so earnestly sought. Furthermore, pulling a belt between two stationary surfaces in this manner causes the pressure shoe to wear quite rapidly, and also causes unduly rapid belt deterioration. Therefore, the pressure shoe and belt are ground away quite rapidly, as well as producing an improper grind on the workpiece.

Therefore, the object of this invention is to move a variable tapered surface and a grinding surface through a controlled generated movement providing a progressive change of relative axial position therebetween, simultaneously with a relative rotation of the workpiece surface and the abrasive surface.

Figure 2:
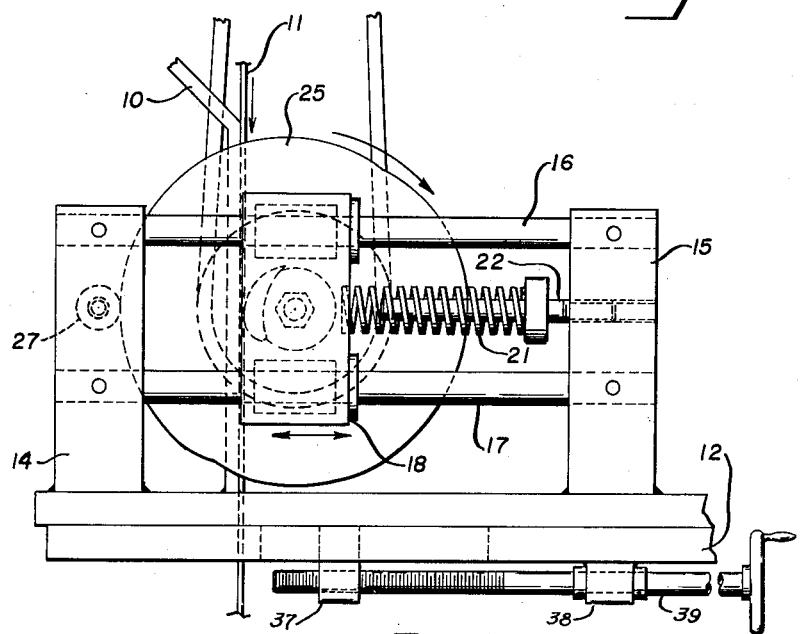
Figure 3:
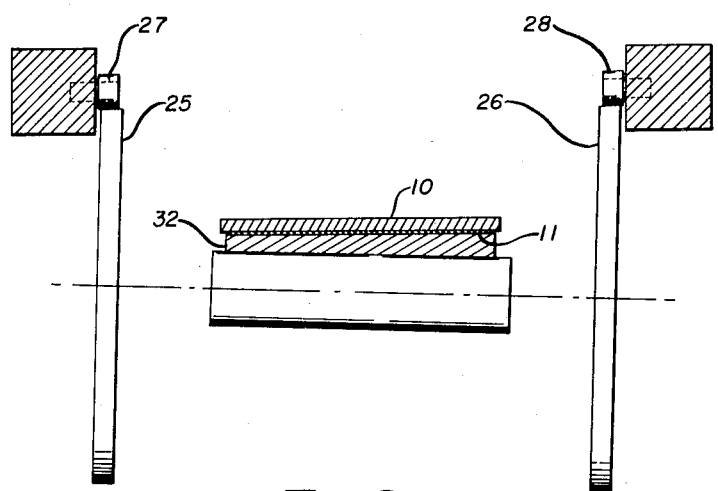
Figure 4:
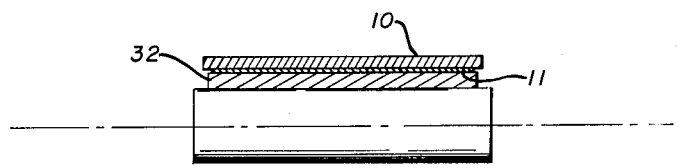

Other objects and a fuller understanding of the invention may be had by referring to the following description and claims, taken in conjunction with the accompanying drawings, in which:

Figure 1 is a view of a spool type work holder made according to the principles of this invention, the view being taken from a position parallel to the axis of the work holding fixture, in what would generally be referred to as the front of the fixture as viewed from the operator's position;

Figure 2 is a view from a lateral position of the fixture beside one cam wheel with the workpiece revolved 180° with respect to the position illustrated in Figure 1; and Figures 3 and 4 are diagrammatic exaggerated illustrations showing the independent action of the two cam members in producing any desired longitudinal shifting of the workpiece to grind or polish a surface made up of a multitude of straight line increments all at different angles, such as in a tapered airfoil blade.

Figures 1 and 2 of the drawings may be referred to for the purpose of illustrating the construction of one embodiment of the invention. Only the device developed for actually handling the workpiece is illustrated in the drawings. This device may be employed with standard types of grinding machines employing a rotating grinding wheel, an endless belt, or even a stationary honing stone. Furthermore, it is to be understood that this device can be and has been operated as a hand tool, although it finds considerably more use as a portion of a mounted power tool.

In the drawings, the only portion of a standard grinding machine that is illustrated is a flat belt guide shoe 10, and an endless abrasive belt 11. Grinding machines having endless belts operating over a flat supporting shoe are common and well known, and accordingly it is unnecessary to illustrate and explain such a machine. Provided on the machine is a table 12. A dovetail slide 35 with guideways 36 provides a longitudinally reciprocable base. Secured to this base in a vertical position, in the particular adaptation of the invention as illustrated, are vertical column members 14 and 15 in Figure 2. Two similar vertical column members are mounted on the opposite side of the grinding abrasive belt 11, and one such member 13 is visible in Figure 1 of the drawings.

Between the back and front vertical column members, that would be column members 14 and 15 in Figure 2, guide rails 16 and 17 are extended and permanently secured. A carriage 18 is mounted upon the guide rails for free longitudinal reciprocable movement. The guide rails 16 and 17 are extended in a direction to guide the carriage 18 in a perfectly perpendicular direction with respect to the surface of the guide shoe 10, in the particular embodiment illustrated. A carriage 19, operating on guide rails similar to 16 and 17, forms the second supporting device on the side of the grinding belt opposite from carriage 18.

Each of the carriage members 18 and 19 carries self-aligning bearings 20 as illustrated in Figure 1 of the drawings. A strong spring member 21, guided upon a spring guide 22, urges the carriage 18 toward the flat guide shoe 10, and a similar spring urges the carriage 19 in the same direction.

A work holding and guiding fixture, which in the preferred embodiment of the invention resembles a large spool, is carried by the carriages 18 and 19 and is mounted in the self-aligning bearings 20. The spool comprises a cam member 25 and a cam member 26. A stub shaft 23 extends from the cam 25 into its self-aligning bearing 20, and a long shaft 24 extends through its self-aligning bearing 20 to a drive pulley 29. The spool is thus a literal, floatable workholder. A suitable rotary driving source rotatably drives the pulley 29 through the V-belts illustrated in the pulley 29. A take-up mechanism of any desired type may be employed to keep the belts tight in the pulley 29 at all times.

A follower member 27 is mounted upon vertical column 14, and a follower member 28 is mounted upon the column corresponding to column 14 on the opposite side thereof. The rear column carrying follower 28 cannot be seen in either Figures 1 or 2, but the follower 28 may be seen protruding therefrom.

A work holding fixture 30 is secured between the cam 25 and the cam 26, and is held in nonrotative relationship with respect to the cams; that is, as the cam rotates, so will the work holding fixture 30. The work holding fixture is in effect the stem of the spool and the cams 25 and 26 are the rims. The work holding fixture 30 is provided with suitable surfaces to mate with a workpiece 32 laid thereagainst, and the work piece 32 is held on the work holding fixture by suitable clamps 31. Therefore, the workpiece 32 will also rotate in unison with the spool.

The cams 25 and 26 are illustrated as relatively large wheels, and one of the wheels, namely cam 25, is illustrated in Figure 2 of the drawings. The outline form of the cam 25, as it is pressed against the follower 27 will cause a back and forth reciprocation of the work holding fixture 30 as the spool is rotatably driven by pulley 29 and shaft 24. The cam 26 may have, but generally does not have, the same outline as cam 25. Therefore, as it is pressed against the cam follower 28, it will produce its own independent shifting of its end of the work holding fixture 30. Consequently, the work holding fixture, as it is rotated about its axis by the shaft 24, will be moved at a constantly varying angle with respect to the flat surface presented by the guide shoe 10. Cam guided grinding has been provided heretofore with surfaces which are uniform. Such guided grinding may be accomplished with a single cam controlling a suitable work holding fixture. However, prior to this invention, there never has been provided a device for causing an independent cam movement of two opposite ends of a work holding fixture for the purpose of providing a constantly varying curved surface. Although each line of contact across the surface being ground must necessarily be a straight line whenever the flat belt guide shoe 10 is employed, nevertheless each successive small increment of surface may be a line at a varying angle with respect to a longitudinal axis of the workpiece. It is this discovery that has made possible the accurate and rapid grinding of tapered airfoil blade structures.

Figures 3 and 4 of the drawings are provided to illustrate the important fact that the two cams 25 and 26 provide independent shifting of their supported ends of the work holding fixture 30. In Figure 3 of the drawings, there is shown a highly exaggerated position of the workpiece and work holding fixture produced by an extreme condition of movement due to the outline forms of independent contour between the cams 25 and 26. Referring now to Figure 4 of the drawings, there is shown a condition wherein the particular portions of the cam members 25 and 26 are substantially identical, and consequently the work holding fixture and workpiece have been brought more nearly to a perfectly lateral position with respect to the surface of guide shoe 10, and consequently will produce a substantially cylindrical increment of surface.

The large wheels are referred to in this application as cams, whereas the small stationary members 27 and 28 are referred to as followers. This terminology is believed to be correct even though generally the followers 27 and 28 remain fixed with respect to the guide shoe 10, and the cams 25 and 26 are rotated. The contour is cut on the members 25 and 26, whereas the followers 27 and 28 are preferably rolling cylinders. Furthermore, although the work holding fixture 30 has been shown in a position between the cams 25 and 26, a solid stem may be provided and the work holding fixture may be extended to one side of the spool, if so desired. Furthermore, although it has been found preferable to rotate the work-holding fixture continually in one direction, it is also entirely possible to oscillate the holder and produce exactly the same grinding results. Hand operation of the work-holding fixture by rolling the spool along two flat guide rails is preferable in some instances, rather than the use of the guide rails and carriage as illustrated.

Often there will be sharp protrusions on pieces which are to be polished; and, therefore, it is not desirable to invoke the full force of the springs 21 at the beginning of the polishing cycle. Consequently, it is preferable to provide a means to feed the entire grinding apparatus, including the cam and cam follower toward the flat belt guide shoe 10 gradually at first until any such protrusions are removed. In the drawings there is illustrated a lug or a boss 37 secured to the bottom of the dovetail slide 35. A suitable longitudinal slot is provided through the table 12 to allow the lug 37 to reciprocate longitudinally. A bearing 38 is permanently secured to the table 12. A screw feed 39 is bearinged in the bearing 38 and threadably engages the lug 37. The screw feed 39 may be driven by a suitable crank 40. Therefore, the entire grinding apparatus is moved to a retracted position, loaded with a workpiece, and then gradually fed toward the final grinding position.

Although the invention has been described in its preferred form with a certain degree of particularity, it is understood that the present disclosure of the preferred form has been made only by way of example and that numerous changes in the details of construction and the combination and arrangement of parts may be resorted to, without departing from the spirit and the scope of the invention as hereinafter claimed.

What is claimed is:

1. In a grinding machine having a moving abrasive element, the provision of a work holding and guiding fixture comprising, a spool supported solely at its ends by self-aligning bearings and having first and second cam wheel members with a workpiece holding fixture stem bridging therebetween, said first and second cam wheel members differing in peripheral outline, first and second cam follower members held in fixed relationship with respect to said abrasive element, said first cam wheel riding against said first cam follower, said second cam wheel riding against said second cam follower, said stem bridging free therebetween, yieldable means pressing said first and second cam wheel members against said first and second cam followers respectively, means to roll said cam wheels against said cam followers, and means to mount a workpiece on said stem, said bearings forming the sole support of said spool and the cam wheel members constituting the sole movement control of said spool whereby said first and second cam wheel members independently provide a positioning effect upon the workpiece through each increment of rotation of the work holding and guiding fixture.

2. In a grinding machine having a moving abrasive element, the provision of a work holding and guiding fixture supported solely by self-aligning bearings at its ends, first and second cam wheel members, said first and second cam wheel members differing in peripheral outline, first and second cam follower members held in fixed relationship with respect to said abrasive element, said first cam wheel riding against said first cam follower, said second cam wheel riding against said second cam follower, yieldable means pressing said first and second cam wheel members against said first and second cam followers respectively, means to mount a workpiece between said first and second cam wheel members in nonrotative relationship with respect thereto, said cam wheel members constituting the sole movement controlling support of the workpiece, and means to roll said workpiece and said first and second cam wheel members as a unit against said follower members.

3. In a surface grinding machine having a flat abrasive belt guide surface with a moving abrasive belt passing over the guide surface, the provision of a work holding and guiding fixture comprising, first and second cam wheel members with a workpiece holding fixture stem bridging therebetween, first and second cam follower members held in fixed relationship with respect to said guide surface, said first cam wheel riding against said first cam follower, said second cam wheel riding against said second cam follower, self-aligning bearing means mounting said cam wheels for independent movement confined to a plane extending at an angle to said guide surface, yieldable means pressing said first and second cam wheel members against said first and second cam followers respectively, and means to rotate said cam wheel members and workpiece holding fixture as a unit.

4. In a surface grinding machine having a flat belt guide surface and a moving abrasive belt passing over said guide surface, the provision of a work holding and guiding fixture comprising a spool, self-aligning bearings at the ends of said spool for floatably supporting the same, said bearings being independently spring biased toward said abrasive belt, said spool including first and second independent rotary cam members mounted by said bearings, first and second cam followers located in fixed relationship to said abrasive belt, said first cam member riding said first cam follower, said second cam member riding said second cam follower, a workpiece holding fixture stem rigidly connecting said cam members to form said spool, said cam members having different non-complementary peripheral outlines and constituting the sole movement control of the workpiece, said spool and bearings constituting the sole workpiece guide means, and the independent non-complementary peripheral outlines of said cam members simultaneously operating against their respective cam followers to independently shift opposite ends of said spool relative to said abrasive belt through a workpiece grinding cycle to provide a constantly varying curved surface on said workpiece.

References Cited in the file of this patent

UNITED STATES PATENTS

| | | |
|---|---|---|
| 481,259 | Feicker | Aug. 23, 1892 |
| 1,434,516 | Whipple | Nov. 7, 1922 |
| 1,849,626 | Kosfeld | Mar. 15, 1932 |
| 2,099,017 | James et al. | Nov. 16, 1937 |
| 2,373,827 | Halford et al. | Apr. 17, 1945 |
| 2,527,285 | Whitehead et al. | Oct. 24, 1950 |